United States Patent [19]

Yoshida

[11] 4,337,642
[45] Jul. 6, 1982

[54] DEVICE FOR JUDGING KNOCKING STRENGTH

[75] Inventor: Kenichi Yoshida, Yokosuka, Japan
[73] Assignee: Nissan Motor Co., Ltd., Yokohama, Japan
[21] Appl. No.: 169,760
[22] Filed: Jul. 17, 1980
[30] Foreign Application Priority Data
   Jul. 18, 1979 [JP] Japan .................................. 54/91199
[51] Int. Cl.³ ............................................ G01L 23/22
[52] U.S. Cl. ........................................ 73/35; 123/425
[58] Field of Search ..................... 73/35; 123/425, 435
[56] References Cited
U.S. PATENT DOCUMENTS
2,508,996  5/1950  Elam .................................. 73/35 X
3,576,526  4/1971  Arnold et al. ..................... 73/35 X
4,153,020  5/1979  King et al. ......................... 73/35 X Primary Examiner—James J. Gill
Attorney, Agent, or Firm—Schwartz, Jeffery, Schwaab, Mack, Blumenthal & Koch

[57] ABSTRACT

A device for judging knocking strength of an engine has a sensor (1) which detects pressure variations in a combustion chamber of the engine. A rectification circuit (3) rectifies the output of the sensor (1), the output of the rectification circuit (3) being smoothed by a smoothing circuit (4) to give the envelope waveform of the output of the sensor (1). The envelope waveform is differentiated by a differentiating circuit (5), the amplitude of the output of the differentiating circuit (5) being used to detect the knocking condition.

6 Claims, 6 Drawing Figures

A

B

C

D

DEVICE FOR JUDGING KNOCKING STRENGTH

BACKGROUND OF THE INVENTION

The present invention relates to a device for judging the strength of knocking produced in an internal combustion engine.

It is known that a continuous occurrence of strong knocking in an engine will affect the durability of the engine; however, light knocking at relatively low engine rotational speeds results in optimum conditions for the engine output and fuel cost characteristics. The ignition timing has a very important relationship for the production of knocking and in general the tendency of production of knocking increases according to the advance of the engine ignition timing.

By taking this feature into consideration, it is known to provide a device to retard or to advance the ignition timing in response to the detected knocking condition by always detecting the knocking strength so as to improve the output and fuel consumption characteristics by maintaining an optimum knocking condition.

It is also known that a vibration pressure component in a particular frequency range relating to the pressure variation in the combustion chamber increases under such a knocking condition. The abovementioned conventional device generally uses this principle and comprises a sensor for detecting the vibration of an engine body. By using the detected electric signal of the sensor, the abovementioned particular frequency component or range is selected and the knocking condition is judged by obtaining a signal indicating the knocking strength. This signal is produced by subtracting a component corresponding to background noise level from the amplitude of said selected signal at that time.

More precisely, at first the aforementioned particular frequency range is separated from the detecting signal of the sensor by using a band-pass filter, then this separated signal is rectified. Thereafter the rectified signal is averaged and this averaged signal is amplified up to a predetermined level corresponding to a noise level of the background signal. Then the level of this signal obtained from the rectification is compared with that of the background signal and a pulse signal, the integrated value of which represents the strength of the knocking, is derived. By an integration of the pulse signal, the strength of the knocking or the occurrence of the same is judged.

In such a conventional system, the knocking strength is judged after various steps as have been mentioned above so it has the disadvantage that the device is complicated.

OBJECT OF THE INVENTION

The present invention has as its object to alleviate the aforementioned disadvantage of the conventional system and to provide a simple device for judging the knocking strength of an engine.

SUMMARY OF THE INVENTION

According to this invention there is provided a device for judging knocking strength of an engine comprising a sensor for detecting vibrations caused from pressure variation in a combustion chamber of the engine, means for deriving an envelope wave from an output of said sensor, means for differentiating said envelope wave and means for judging knocking strength based on a value of said differential signal.

DESCRIPTION OF THE PREFERRED EMBODIMENT

The invention will now be described by referring to the accompanying drawings.

Figure 1:
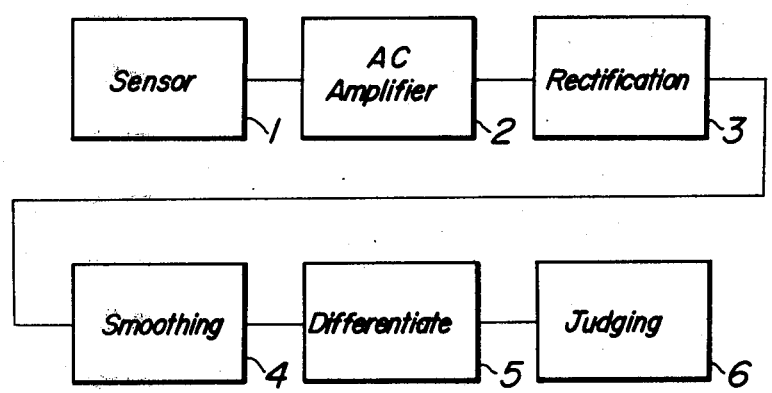
FIG. 1 is a block diagram of one embodiment of the present invention.

In FIG. 1, a sensor 1 detects the various vibrations caused by variations of pressure in the combustion chamber, for instance, vibration of the engine body, sound waves generated from the engine body or the like, and converts them into an electric signal.

In the output signal of the sensor 1, frequency components or ranges not related to the knocking are also included. In the conventional device, it is necessary to select a particular frequency component or range accompanying the knocking by passing the output signal of the sensor 1 through a bandpass filter having its resonant frequency coincident with the particular frequency at the occurrence of the knocking.

However, if the sensor 1 is formed of a resonant type vibration sensor of which the resonance frequency is coincident with the aforementioned particular frequency, the sensor 1 itself has the selecting capability so that it is not necessary to use such a band-pass filter.

Figure 2:
FIGS. 2 and 3 are time charts for explaining the operation of the circuit shown in FIG. 1.
Figure 2:
Figure 2:
Figure 2:

An example of an output signal of such resonant type sensor 1 is shown in FIG. 2, curve A, which has increasing amplitude at the time of occurrence of the knocking.

Namely, an enlarged amplitude portion of the envelope wave, which means a curve connecting the top points of the vibratory waveform, of said output signal represents the knocking. For instance, the inclination of the rising (or descending) curve of the enlarged amplitude portion becomes steeper under stronger knocking condition.

An AC amplifier 2 connected to the output of the sensor 1 amplifies the output signal thereof up to a predetermined level.

A rectification circuit 3 effects fullwave or halfwave rectification of the output signal of the sensor 1 applied thereto through the AC amplifier 2 and delivers an output signal as shown in FIG. 2, curve B.

In order to obtain the envelope waveform of the output signal of the sensor 1, a smoothing circuit 4 is provided in series, which converts the abovementioned rectified signal in a smooth form as shown in FIG. 2, curve C which corresponds to the respective envelope waveform of the vibration waveform.

A differentiating circuit 5 connected thereafter differentiates the output signal of the smoothing circuit 4 to form a differentiated signal shown in FIG. 2, curve D.

A knocking strength judging circuit 6 connected thereafter detects a difference between the maximum (a maximum value of ascending inclination at the enlarged amplitude portion of the envelope waveform), and the minimum (a minimum value of descending inclination of the enlarged amplitude portion of the envelope waveform) values of the differentiated signal of said envelope waveform, i.e. the amplitude of the curve shown in FIG. 2, curve D. Or, it may detect only the maximum value for effecting the judgement.

Figure 3:
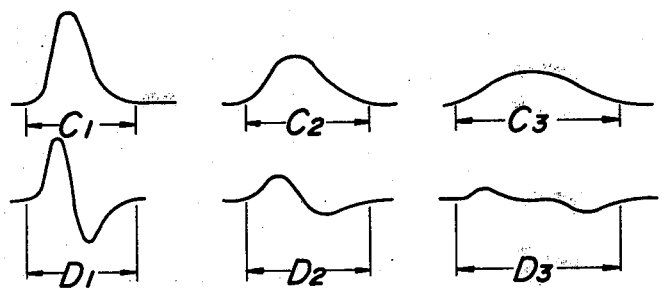

The inclination of the curve of the enlarged amplitude portion of the envelope waveform becomes steeper with an increase of the knocking strength. Accordingly the smoothing circuit 4 delivers an output signal, for example, the signal shown in FIG. 3, curve $C_1$ at for a strong knocking condition, the signal as shown in FIG. 3, curve $C_2$ for a medium knocking condition, and that in FIG. 3, curve $C_3$ for a light knocking condition. Namely, it delivers a signal having a less steep enlarged amplitude portion as the knocking condition becomes lighter.

The differentiating circuit 5 delivers the differentiating signals as shown in FIG. 3, curves $D_1$, $D_2$ and $D_3$, respectively, which meet the above knocking conditions.

As can be seen clearly from the curves in FIG. 3, the amplitude or maximum value of the differentiating signal increases with an increase of the knocking strength. Therefore, the knocking strength judging circuit 6 for detecting this difference eventually can utilize this principle and finally it judges the knocking strength based on said principle.

Figure 4:
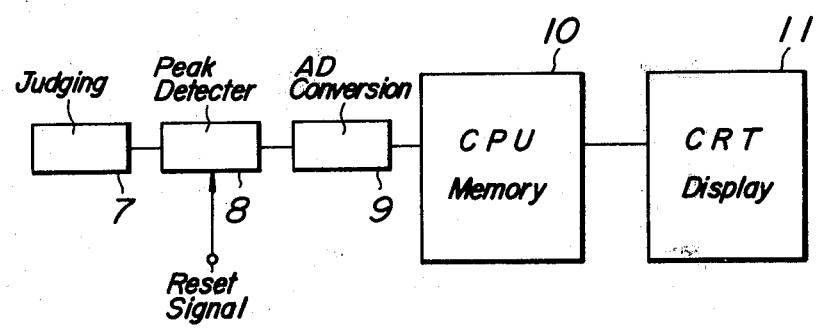
FIG. 4 is a more practical block diagram of the device of the present invention.

As one practical embodiment of the present invention, there is shown in FIG. 4, a knocking meter for testing the knocking condition.

In the drawing, a judging circuit 7, corresponding to the device of the present invention, in which the knocking strength judging circuit 6 of FIG. 1 is not provided, delivers from its differentiating circuit an output signal having the waveform as shown in FIG. 2, curve D, to a peak detector circuit 8. This circuit 8 holds the maximum value of said output signal, which is then digitally converted into a digital signal by an A-D converter 9 and memorized in a CPU memory 10.

The peak detector circuit 8 is reset at each ignition so as to hold the respective maximum value at each said ignition. This value is successively memorized in the CPU memory 10.

Figure 5:
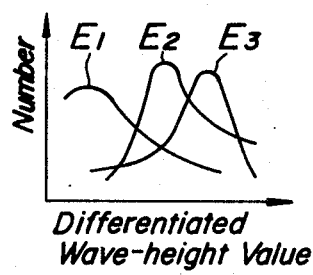
FIG. 5 is a graph showing one type of display on a CRT display in the device shown in FIG. 4.

A number corresponding to knocking strength information for each ignition is thus stored and memorized in the memory. This number is displayed on a CRT display device 11 in two-dimensional form. In FIG. 5, $E_1$ represents a distribution curve during a trace knocking condition, $E_2$ represents the distribution curve during a light knocking condition, and $E_3$ represents the distribution curve during a heavy knocking condition. With these curves the knocking condition of the engine can be accurately identified visually.

Figure 6:
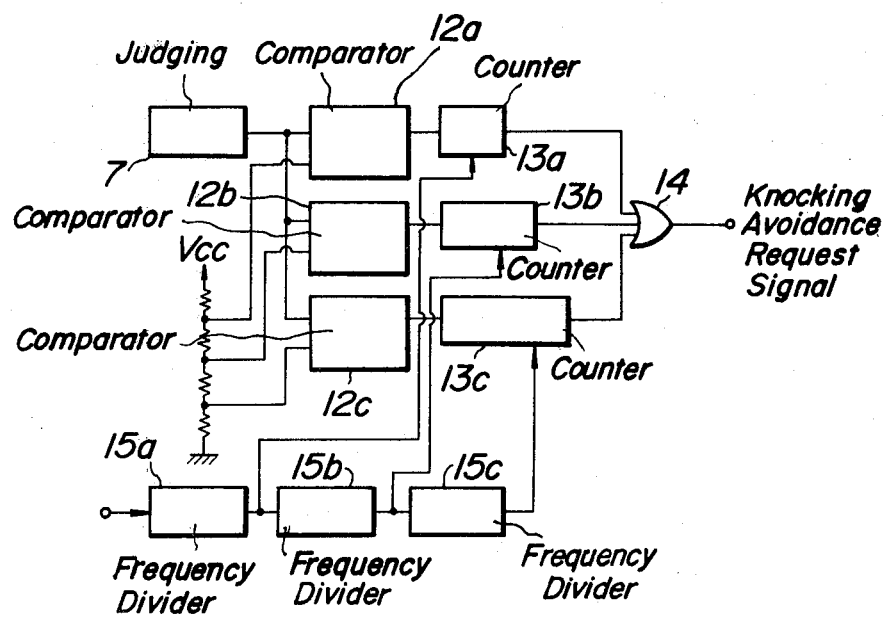
FIG. 6 is a block diagram of a further embodiment of the present invention.

Another application of the present invention is shown in FIG. 6, which indicates an embodiment of a knocking avoidance device.

An output signal of a judging device 7 for the knocking strength according to the present invention is supplied to comparators 12a, 12b and 12c. The number of strong knocking signals is counted by a counter 13a of small capacity, the number of medium knocking signals is counted by a counter 13b of medium strength capacity, and the number of light strength knocking signals is counted by a counter 13c of large capacity, respectively. When any one of the three counters 13a, 13b and 13c overflows, a knocking avoidance request signal is sent to the output through an OR circuit 14.

This means that under a strong knocking condition, the knocking avoidance request signal is sent even when a small number of knocks occur, but on the contrary under a light knocking condition said request signal is not sent unless a great number of knocks occur. Namely, the control speed of knocking avoidance increases according to an increase of the knocking strength.

The abovementioned counters 13a, 13b and 13c are reset at predetermined periods according to a crank rotation signal via frequency dividers 15a, 15b and 15c.

If the knocking avoidance requesting signal is delivered, the ignition timing is retarded in response to this signal.

As has been explained in the foregoing, the knocking strength can be judged very accurately in a very reasonable response time by a device according to the present invention. The device can be formed from a combination of relatively simple circuit elements, for instance, a rectifying circuit, smoothing circuit, differentiating circuit, etc.

What is claimed is:

1. A device for judging the knocking strength of an internal combustion engine comprising, in combination:
    a resonant type vibration sensor having a resonant frequency which coincides with a knocking frequency range of the engine to be detected, said sensor being connected for detecting vibrations of the engine in its combustion chambers and for delivering an electric output signal corresponding to the vibrations;
    means including a rectifier circuit and a smoothing circuit for deriving a rectified envelope wave from said electric output signal;
    means for differentiating said envelope wave to form a differentiated output signal having an amplitude representing the steepness of the envelope signal; and
    means for judging the knocking level based on the value of the differentiated signal.

2. A device for judging knocking strength as claimed in claim 1, wherein said judging means detects the amplitude of said differentiated signal.

3. A device for judging knocking strength as claimed in claim 2, wherein said judging means detects the maximum value of said differentiated signal.

4. A device for judging knocking strength as claimed in claim 1, wherein said judging means comprises a peak detector being fed with the output signal of the differentiating means and for holding a maximum value of the output signal, means for resetting said peak detector after each engine ignition, an A-D converter for converting each maximum value into a digital signal, a memory circuit for memorizing each digital value, and a two-dimensional visual display for displaying a distribution of the maximum values representing engine knocking.

5. A device for judging knocking strength as claimed in claim 1, wherein the output signal of the judging means is further fed to a knocking avoidance circuit for controlling ignition timing of said engine.

6. A device for judging knocking strength as claimed in claim 5, wherein the knocking avoidance circuit comprises a plurality of counters, means for passing output signals from said A-D converter to said counters such that each counter receives signals indicative of a different knocking strength, and means for delivering a knocking avoidance request signal when the count in any of said counters reaches a predetermined level.

* * * * *